(12) United States Patent
Haghighi

(10) Patent No.: US 9,239,784 B1
(45) Date of Patent: Jan. 19, 2016

(54) SYSTEMS AND METHODS FOR MEMORY MANAGEMENT

(71) Applicant: Amazon Technologies, Inc., Reno, NV (US)

(72) Inventor: Siamack Haghighi, Laguna Niguel, CA (US)

(73) Assignee: Amazon Technologies, Inc., Reno, NV (US)

( * ) Notice: Subject to any disclaimer, the term of this patent is extended or adjusted under 35 U.S.C. 154(b) by 232 days.

(21) Appl. No.: 13/910,796

(22) Filed: Jun. 5, 2013

(51) Int. Cl.
*G06F 12/08* (2006.01)
*G06F 12/02* (2006.01)

(52) U.S. Cl.
CPC ........ *G06F 12/0246* (2013.01); *G06F 12/0811* (2013.01); *G06F 12/0897* (2013.01)

(58) Field of Classification Search
CPC ............ G06F 12/0811; G06F 12/0871; G06F 12/0897
See application file for complete search history.

(56) References Cited

U.S. PATENT DOCUMENTS

| | | | | |
|---|---|---|---|---|
| 6,138,209 A * | 10/2000 | Krolak et al. | ................. | 711/128 |
| 8,489,820 B1 * | 7/2013 | Ellard | ........................... | 711/138 |
| 8,650,266 B2 * | 2/2014 | Cohen | .......................... | 709/219 |
| 2013/0346672 A1 * | 12/2013 | Sengupta et al. | ............ | 711/103 |
| 2014/0215158 A1 * | 7/2014 | Kocberber et al. | ........... | 711/122 |
| 2014/0304473 A1 * | 10/2014 | Zachariassen et al. | ....... | 711/122 |

* cited by examiner

*Primary Examiner* — Hiep Nguyen
(74) *Attorney, Agent, or Firm* — Sutherland Asbill & Brennan LLP

(57) ABSTRACT

Systems and methods for extending the memory resources of a user device to storage resources and/or network resources associated with the user device. The cache and system memory of the user device may be utilized as a cache memory and the storage resources and/or network resources of the user device may be utilized as a storage memory.

20 Claims, 9 Drawing Sheets

SYSTEMS AND METHODS FOR MEMORY MANAGEMENT

BACKGROUND

In certain computing devices, such as mobile devices, due to size, cost and thermal constraints, there may be limitations in the size of cache and system memory available. Users of these computing devices may wish to use a variety of applications and files at the same time and these applications and files may require memory resources that may exceed the size of the cache and system memory available on the computing device. Therefore, the computing device may shut down or otherwise not execute one or more applications and/or files requested by the user on the computing device. This may cause dissatisfaction for the user with his or her interaction with the computing device.

BRIEF DESCRIPTION OF THE DRAWINGS

The detailed description is set forth with reference to the accompanying figures. The use of the same reference numbers in different figures indicates similar or identical items; however, various embodiments may utilize elements and/or components other than those illustrated in the figures.

DETAILED DESCRIPTION

Overview

Figure 1:
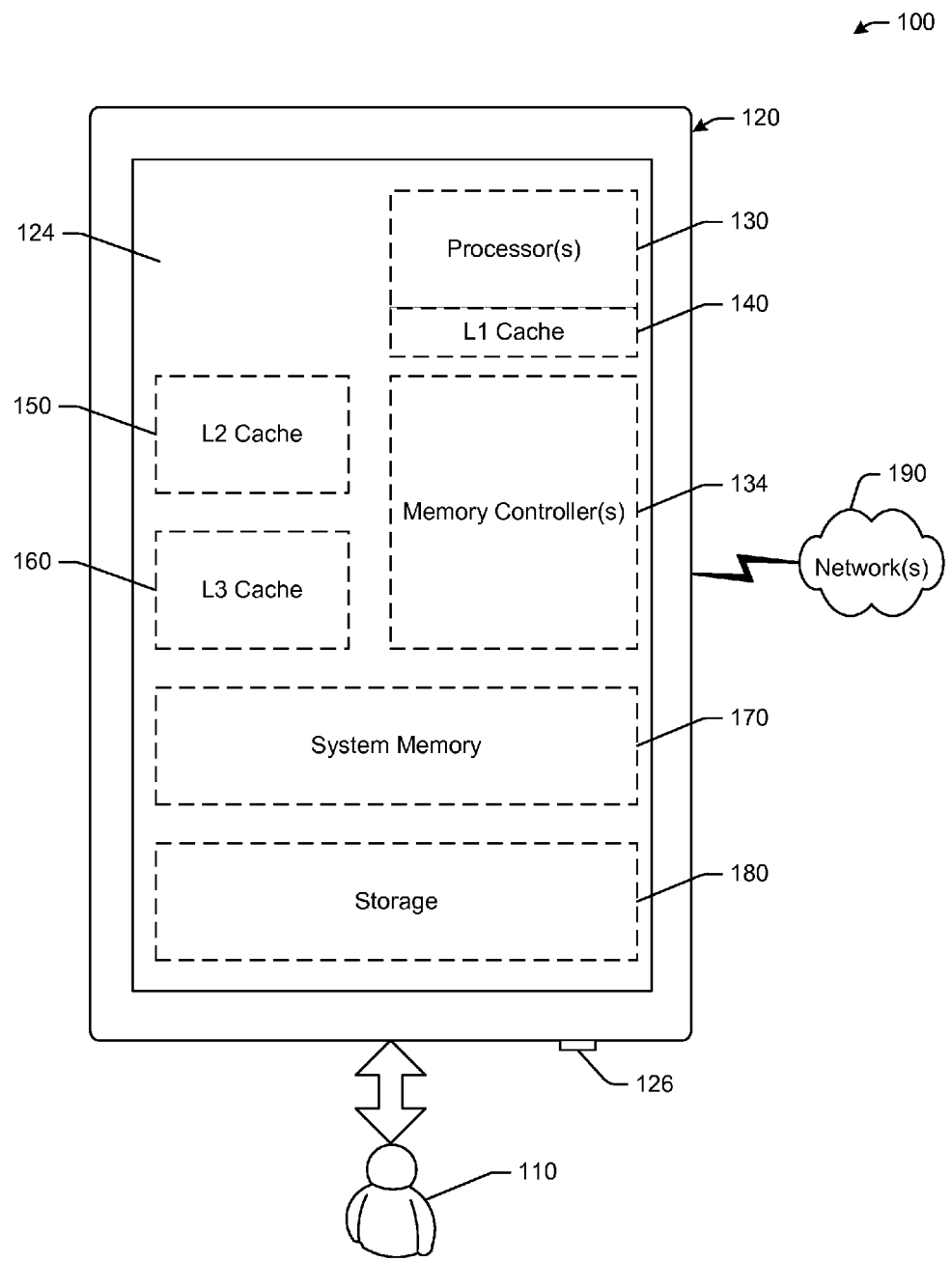
FIG. 1 is a schematic diagram that illustrates an example user device use environment with an example user device configured to manage its memory, in accordance with embodiments of the disclosure.

Embodiments of the present disclosure may include systems and methods for extending the memory resources used on user devices for creating, manipulating, and/or using one or more software applications and/or data files to storage, such as flash memory and/or network resources. In other words, the user device may use a combination of cache memory, system memory, storage devices, and/or network resources for providing memory resources to processors of the user device. These memory resources may be used to provide functionality associated with applications and/or data files that are in operation and/or use on the user device. In this case, the memory resources on the user device for executing applications and accessing data files may extend beyond cache memory and/or system memory of the user device to the storage resources of the user device. Indeed, the memory and/or storage resources used for executing applications and/or accessing data files may span various levels of memory and/or storage resources. The memory and/or storage resources used by the user device for executing one or more applications and/or accessing one or more data files may span from various levels of cache memory, system memory, and/or storage resources. The storage resources of the user device may, therefore, be used for storage of data elements, such as data arrays, application programs, and/or data files that are not currently in use by the user device, as well as applications and/or data files that are currently being executed, accessed, and/or otherwise used.

In certain further embodiments, the memory resources utilized by the user device may extend to one or more networks and storage resources thereon. For example, in these embodiments, the memory resources utilized by the user device for the operation of applications and/or accessing data files may extend to one or more servers and or storage devices accessible via networks, such as the Internet. In some cases, these remote servers, such as cloud servers, may be available for access by the user device via one or more networks for the purposes of memory resource extension thereon.

According to certain embodiments of the disclosure, the user device may be configured to execute one or more applications and/or access one or more data files. These applications and/or data files may utilize the memory resources, such as cache memory and/or system memory, of the user devices. The user device and the processors thereon may store one or more data elements, such as data pages, data arrays, and/or data files on various levels of memory. In many use cases of the user device, the user device may be operated in a memory constrained environment, where user demands for memory resources may exceed the memory resources, such as cache and/or system memory, available on the user device. The user device, therefore, may be configured to determine if the cache and/or system memory required for executing one or more applications and/or accessing one or more data files exceed the available memory resources of the user device. This determination may be made by the user device by one or more processors of the user device, one or more memory control hubs of the user device, or a combination thereof. The determination may entail comparing the expected memory resource requirements for execution of a particular application or to access a particular data file to the available cache and/or system memory available on the user device. In some cases, the determination may further entail consideration of the memory usage of other applications, data pages, data arrays, and/or data files that are currently being executed or being accessed by the user device or is otherwise using memory resources of the user device. The user device and the processors and/or memory control hubs thereon may be configured, in certain embodiments, to make the determination of lack of available memory resources prior to launching a new application or opening a new data file. The determination of lack of memory resources may be made responsive to receiving a request to launch a new application or open a new data file, such as on behalf of the user and/or from another application being executed on the user device and the processors thereon.

In certain embodiments, the user device may be configured to extend its memory resources beyond its cache memory and/or system memory to storage resources of the user device. In this case, the combination of the memory resources, such as the cache memory and system memory, and storage resources, such as flash memory or hard disk drives, may be combined into one unified addressable information space. This information space may be further partitioned into a cacheable memory that includes memory and/or storage resources other than the highest level of memory and/or storage and a storage memory that may include the highest level of memory and/or storage of the user device. In this case, the cacheable memory may include various levels of cache memory (L1, L2, and/or L3) of the user device, in addition to the system memory of the user device and the storage memory may include a NAND flash storage device of the user device. In certain embodiments, upon determination that the cache and/or system memory of the user device does not contain application and/or data file requested by the user of the user device or another application executing on the user device, the user device cache misses will be serviced from higher level caches including system memory or flash memory.

In embodiments of the disclosure, the system memory, such as dynamic random access memory (DRAM), may be considered as cache memory from the standpoint of applications and/or operating systems operating on the user device. The full memory resources or the full addressable information space of the user device may include various levels of cache (e.g. L1, L2, and/or L3), system memory, and extension of the memory resources onto storage resources of the user device (e.g. flash memory, hard disk, etc.). Data may be stored on the highest hierarchy of the data space, such as flash memory, and all of the lower levels of memory may be used and/or treated as cache memory by the user device and the processors thereon. Therefore, data from the highest hierarchical level, such as flash memory, may also be cached at a cache, including the various levels of cache and system memory. The data that may be cached by the processors of the user device on the cache may be based at least in part on the frequency of access of applications and/or data files, and/or the impact to quality of service (QoS) or otherwise, user experience, associated with data access latency of applications and/or data files that are used by the user device.

According to embodiments of the disclosure, when the user device receives a request for data, such as cacheable data, from one or more applications running on the user device, the processors of the user device may be configured to request the data from the combination of various levels of cache memory and system memory. If the requested data is found (i.e. a "cache hit") then the appropriate data pages that contain the requested data may be retrieved from the cache memory. Physically this means that the data may be retrieved from the unified addressable memory space provided by the various levels of cache and/or system memory resources. If there is a "cache miss," or otherwise if the data is not found in a cache level including the combination of the cache memory levels and system memory, then the processors of the user device may access a memory manager, such as a page table to determine storage memory that may include flash storage device(s), where the requested data page(s) are located. Therefore, in this case, the memory manager access may indicate that the requested data is stored in the storage resources of the user device, such as in flash memory. Upon determining the storage address of the requested data, the processors and/or memory control hub may receive and/or fetch the requested data page(s) from the storage address, such as the storage address in flash memory storage.

The memory manager and the page table(s) stored thereon may, in certain cases, be stored in registers of the processor or upper level (e.g. L1) cache memory. In other cases, the memory manager may be in lower level cache (e.g. L2 or L3) or system memory. In yet other cases, the memory manager may be distributed across multiple levels of memory and/or storage such as one or more of cache memory, system memory, and/or storage. The memory manager may provide a mapping of data index or virtual index, as used by applications running on the processors of the user device, to storage addresses, such as on the highest tier of the memory hierarchy, such as an extension of the memory onto storage resources.

Upon transferring one or more data elements from cache and/or system memory to storage resources, the user device and the processors and/or memory control hubs thereon may update the memory manager and/or page table(s). In some cases, the page table may be stored in a TLB and provide information associated with mapping an index and/or software data address, such as a data index, to a storage address on the storage resources, such as flash memory.

In other embodiments, there may be multi-tiered memory managers and/or TLBs. Therefore, in these embodiments, if the processors and/or memory control hubs attempt to access particular data, such as data requested by a particular application, the processors and/or memory control hubs may first seek the data in the cache memory. If the requested data is found in cache memory, then the data page(s) associated with the requested data may be received and/or retrieve by the processors and/or memory control hubs. However, if a cache miss is encountered, then a first TLB may be consulted to identify a storage address in a next higher level cache memory such as L3 cache or system memory. At that point, the processors may attempt to receive and/or retrieve the data based, at least in part on the storage address identified by accessing the first TLB. If the requested data is found, then the data page(s) associated with the requested data may be received and/or retrieve by the processors and/or next higher level cache memory. However, if another cache memory miss is encountered, then a second TLB may be accessed to determine the storage address in the storage memory where the requested data may be found. At this point, the processors and/or memory control hub, such as a flash memory control hub, may attempt to retrieve the requested data and the associated data page(s) from the storage memory including the extension of memory on the storage resources, such as flash memory storage. In other variations, by accessing the first TLB, the processors and/or memory control hubs may determine that the requested data is not stored on any portion of the cache memory without having to actually access the cache memory. The processors, at that point, may access the second TLB to determine the location of the requested data in the storage memory on the storage resources of the user device.

In certain other embodiments of the disclosure, the memory resources of the user devices may be extended beyond the storage resources of the user device when the applications and/or data files executed and/or accessed by the user device exceeds the memory resources available to the user device from a combination of cache memory, system memory, and storage resources. In other words, the user device may be configured to extend its memory resources for the purposes of executing applications and/or accessing data elements to resources accessible via one or more networks.

For example, one or more servers and/or storage resources, such as cloud based servers, may be accessed via one or more networks for the purposes of storing data associated with application execution and/or accessed data file thereon. In these cases, the highest level of memory and/or storage resources may be allocated to storage memory and all the levels above the highest level of the hierarchy of memory and/or storage resources may be allocated to cache memory. Therefore, the network resources, such as cloud based storage servers, may be utilized as the storage memory of the user device and a combination of the various levels of cache memory (L1, L2, and/or L3), system memory, and/or storage resources of the user device, such as NAND flash, may be utilized as cache memory of the user device.

When the memory and/or storage resources are organized and utilized in this manner, the processors of the user device may access the information space including the various levels of cache memory, the system memory, the user device storage resources, and network storage resources as a single addressable space. When seeking particular data stored in this data space, the processors may first access the cache memory using an index associated with the data to be found. If the data is found in the cache memory using the index associated with the data, then the data may be retrieved via one or more hierarchies of the cache memory. If the data is not found in the cache memory, then a memory manager, sometimes in the form of a TLB and page tables stored thereon, may be accessed to determine a storage address on the storage memory, including the network resources, from where the data may be received by the processors. In some of these cases, there may be a single level of TLB, and in other cases, there may be multi-tiered TLBs, such as a three level TLB.

In certain further embodiments, the memory and/or storage resources of the user device may be organized to accommodate non-cacheable data storage by the user device and/or the processors thereon. In these cases, a portion of the system memory may be reserved, apart from the portion allocated to the cache memory for storing non-cacheable data thereon.

It will be appreciated that in some cases, when a user device is operated in a limited memory situation, and a user of the user device wishes to use additional memory resources of the user device, such as by opening a new application, the user device and the processors and/or operating system thereon may be forced to shut down one or more applications to accommodate the activities associated with the additional use of memory resources. This may result on a relative reduction in user satisfaction in interacting with the user device. Furthermore, it may also result in loss of data or other information. The systems and methods as disclosed herein may provide a mechanism for the user device to extend its memory resources beyond memory devices, such as cache and/or system memory, to storage devices, such as NAND flash memory or beyond to network resources. As a result of extending and/or expanding its memory resources, the user device may be configured to keep one or more applications and/or data files open while accommodating user requests that may require additional memory resources, even in a limited memory environment. By doing so, a relatively enhanced user experience may be provided to the user of the user device compared to not having the ability to extend memory resources into storage devices of the user device.

The storage resources, such as NAND flash, of the user device may generally provide slower data access than the memory resources of the user device. Therefore, quality of service (QoS) of particular applications, frequency of access of applications and/or files, or a particular user's relative interest in particular applications and/or data files may be considered when determining what data associated with particular applications and/or data files are to be cached in the cache memory of the user device. By doing so, the user may be provided with a relatively greater level of user satisfaction in his/her interaction with the user device.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Referring now to FIG. 1, a schematic diagram that illustrates an example user device use environment 100 where a user 110 may be able to interact with user device 120 configured to manage its memory, in accordance with embodiments of the disclosure, is described. The user device 120 may include one or more user device 120 may include one or more user input/output (I/O) interfaces, such as a touch sensitive display screen 124 and one or more buttons 126 with which the user 110 may interact with the user device 120. The user device 120 may further include one or more processors 130 that may be communicatively linked to a variety of other elements of the user device 120. The user device 120 may still further include one or more memory control hubs 134 and a variety of memory resources, such as Level 1 (L1) cache memory 140, Level 2 (L2) cache memory 150, Level 3 (L3) cache memory, and system memory 170. The user device 120 may yet further include storage 180.

The users 110 may be an individual or other entity, such as corporations, non-profit organizations, for-profit organizations, government organizations, public sector organizations, or any of the aforementioned entities located in this or foreign countries. In certain embodiments, multiple users 110 may be able to access the user device 120, such as utilizing a user profile and/or user authentication unique to that user 110. In these cases, the embodiments as disclosed herein may be available to multiple users 110 of the user device 120. In other words, the multiple users 110 may be configured to access an addressable information space of the user device 120. The user device 120 may be any one of suitable devices that may be configured to execute one or more applications, software, and/or instructions and/or access, create, open, modify, and/or close one or more data files. Therefore, the user device 120 may be configured to execute a variety of software, applications, code and/or instructions to perform a variety of functions. The user device 120, as used herein, may be any variety of client devices, electronic devices, communications devices, and/or mobile devices. The user device 120 may include, but is not limited to, tablet computing devices, electronic book (ebook) readers, netbook computers, notebook computers, laptop computers, desktop computers, personal digital assistants (PDA), smart phones, web-enabled televisions, video game consoles, set top boxes (STB), or the like. While the drawings and/or specification may portray the electronic device 120 in the likeness of an ebook reader and/or tablet computing device, the disclosure is not limited to such. Indeed, the systems and methods described herein may apply to any electronic device capable of displaying executing applications and/or accessing data files.

While these specific I/O components 124, 126 are shown, there may be any number and/or variety of I/O components and/or sensors disposed on the user device 120, such as one or more image sensors, microphones, accelerometers, speakers, haptic devices, or the like. The touch sensitive display screen 124 may be any suitable touch sensitive display, including, but not limited to a capacitive panel. The capacitive panel may have a plurality of capacitive cells (not shown) of any shape and size that may have a varying charge associated therewith. The charge on each cell may vary based on proximity of a pointing device, such as a finger near one or more of the cells and the variation in charge may be interpreted by the user device 120 as an indication of touching the touch sensitive display screen 124. The functioning of capacitive panels is well known, and in the interest of brevity, will not be reviewed here. The touch sensitive display screen 124 and/or other I/O components 126 may be configured to accept user input and/or output information to the user 110.

The user device 120 may be further configured to access one or more networks 190 and entities thereon, such as remote servers, cloud servers, and/or cloud storage resources. The networks 190 may include any one or a combination of different types of suitable communications networks, such as cable networks, the Internet, wireless networks, cellular networks, and other private and/or public networks. Furthermore the networks 190 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. It is also noted that the described techniques may apply in other client/server arrangements (e.g., set-top boxes, etc.), as well as in non-client/server arrangements (e.g., locally stored software applications, etc.).

Figure 2:
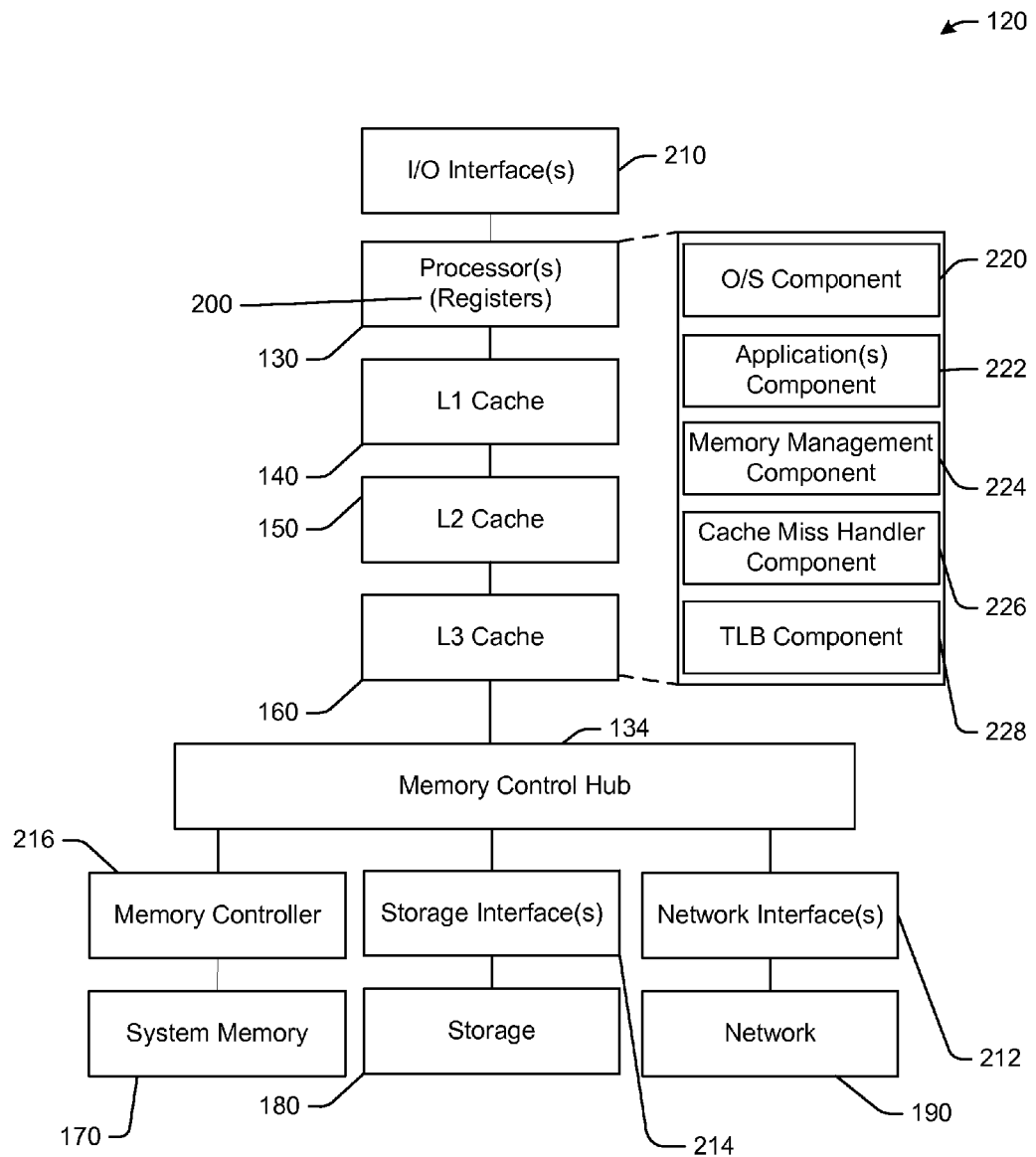
FIG. 2 is a schematic diagram that illustrates example functional and/or physical components of the example user device of FIG. 1, including memory and storage components, in accordance with embodiments of the disclosure.

Referring now to FIG. 2 with continuing reference to FIG. 1, example functional and/or physical framework of the user device 120, including memory 140, 150, 160, 170 and storage 180 components, in accordance with embodiments of the disclosure, is described. The user device 120 may include one or more I/O device interfaces 210, one or more network interface(s) 212, one or more storage interface(s) 214, and one or more memory controllers 216. The user device 120 may further include an operating system (O/S) component 220, an application(s) component 222, a memory management component 224, a cache miss handler component 226, and a translation lookaside buffer (TLB) component 228.

In some examples, the processors 130 of the user device 110 may be implemented as appropriate in hardware, software, firmware, or combinations thereof. Software or firmware implementations of the processors 130 may include computer-executable or machine-executable instructions written in any suitable programming language to perform the various functions described. Hardware implementations of the processors 130 may be configured to execute computer-executable or machine-executable instructions to perform the various functions described. The one or more processors 130 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 120 may also include a chipset (not shown) for controlling communications between the one or more processors 130 and one or more of the other components of the user device 120. The one or more processors 130 may also include one or more application specific integrated circuits (ASICs) or application specific standard products (ASSPs) for handling specific data processing functions or tasks.

The processors 130 may include one or more registers 200 for storing data for relatively quick access by the processors 130, such as while executing one or more applications 222. The registers may be data registers, instruction registers, or combinations thereof. The registers may be implemented as flip-flops, latches, random access memory (RAM), dynamic RAM (DRAM), static RAM (SRAM), or combinations thereof. The registers may be the top level of the processors' 130 and or user device's memory hierarchy, as discussed further with reference to FIG. 3. The registers 200, as shown, may be any suitable size of register, such as a 32 bit register, and any suitable data type, such as integer data type or floating point data type. The processors 130, may in certain embodiments, may be configured, such as by the O/S 220, to populate at least one of the one or more registers 200 with data received and/or retrieved from one or more levels of memory 140, 150, 160, 170, or from storage 180.

The memory control hub 134 may be devices and/or components integrated on-chip with the processors 130 to provide functionality related to various aspects of memory read and/or write access. The memory control hub 134 may provide the processors 130 with functionality such as logical address to storage address translation, memory protection, cache control, and/or data bus arbitration. The memory control hub 134 may be configured to access and/or update page tables and or page table entries in the TLB 228. It will be appreciated that in certain embodiments, the memory control hub may be integrate, such as within a single package (e.g. package-on-package (PoP) or system-in-package (SiP)) or on a single integrated circuit (e.g. system-on-chip (SoC)). It will further be appreciated that in certain other embodiments, the user device may not have a memory control hub; instead the functionality associated with a memory control hub 134, as discussed above, may be provided by the processors 130.

The various levels of cache memory 140, 150, 160 may provide relatively fast access to stored data to the processors 130, such as during the execution of one or more applications, such as those stored in the applications component 222. The various levels of cache memory may be, in certain embodiments, one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), or RAM-BUS DRAM (RDRAM). It will further be appreciated that in certain embodiments, there may be fewer or more levels of cache memory than the three levels depicted here. For example, in some example cases, there may only be two levels of cache memory. Furthermore, in certain embodiments, one or more levels of cache memory 140, 150, 160 may be segmented and/or partitioned. For example, a particular level of cache memory 140, 150, 160 may have a data cache partition and an instruction cache partition. In these cases, there data and/or instructions stored in a particular level of cache memory 140, 150, 160 may be segregated. In one non-limiting example, there may be three levels of SRAM cache 140, 150, 160, where L1 cache 140 and L2 cache 150 may have separate data and instruction segments. In another non-limiting example, there may be two levels of SRAM cache 140, 150 with no partitions therein. Further still, the various levels of cache memory 140, 150, 160 may be any suitable size and/or capacity.

The input/output (I/O) device(s) 124, 126, such as the touch sensitive display screen 124, may be controlled via the one or more I/O device interfaces 210. The network interfaces(s) 212 may allow the user device 110 to communicate via network 190 and/or via other communicative channels. For example, the user device 120 may be configured to communicate with stored databases, other computing devices or servers, user terminals, other devices on the networks 190 and/or repositories of data. The storage interface(s) 214 may enable the user device 120 to receive and interpret signals from the one or more storage devices 180.

The system memory 170 may store program instructions that are loadable and executable on the processor(s) 130, as well as data generated or received during the execution of these programs. The system memory 170 may include random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof. In a particular non-limiting example, the system memory may be 1 Gigabyte (GB) of DRAM.

The components 220, 222, 224, 226, 228 may be any combination of hardware, software, or firmware. For example, in certain embodiments, one or more of the components 220, 222, 224, 226, 228 or portions thereof may be implemented as software modules and may reside in memory 140, 150, 160, 170, storage 180, network resources accessible via the networks 190, or combinations thereof. In other cases, the components 220, 222, 224, 226, 228, or portions thereof may be implemented in hardware, such as on the processors 130, memory control hub 134, and/or other integrated circuits included in the user device 120.

The O/S component 220 may have one or more operating systems stored thereon. The processors 130 may be configured to access and execute one or more operating systems stored in the (O/S) component 220 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) component 222 may contain instructions and/or applications thereon that may be executed by the processors 130 to provide one or more services to the user. These instructions and/or applications may, in certain aspects, interact with the (O/S) component 220 and/or other modules of the user device 120. The applications component 222 may have instructions, software, and/or code stored thereon that may be launched and/or executed by the processors 130 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof. In certain embodiments, the applications that are stored in the applications component 222 and executable by the processors may utilize various levels of memory 140, 150, 160, and/or 170. For example, a particular application may generate and store files in memory 140, 150, 160, 170 while operating. In certain embodiments, applications may also utilize storage device 180 resources of the user device 120. For example, a particular application may generate and store files in storage 180. Further still, in certain embodiments, applications may further utilize one or more remote servers via the network 190.

The instructions and/or functionality associated with the memory management component 224 may cooperate with the memory control hub 134 and/or the processors 130 to provide various memory management operations for the user device 120. The memory management component 224 may include instructions stored thereon that when executed by the processors 130 may configure the processors 130 to access and/or store data, such as application data, page data, and/or data files, at the appropriate hierarchical level of memory 140, 150, 160, 170, and or storage 180. Therefore, the processors 130 may be configured to consider the access times, data file/page size, and other metrics to determine where in the memory resource hierarchy a particular data or block of data should be stored.

The processors 130 in further cooperation with the memory management component 224 may be configured to determine when memory resources 140, 150, 160, 170 of the user device 120 may be relatively low compared to the requirement for memory 140, 150, 160, 170, such as from applications running on the processors 130. The processors 130 may, in certain embodiments, be configured to make this determination by ascertaining the percentage of the available memory resources that are being utilized for various functions of the processors 130. Additionally, the processors 130 may be configured to determine if additional requests for memory usage, such as in the form of the user 110 requesting to open a new application may be accommodated based at least in part on the level of memory resources available and/or expected memory usage of the requested functionality.

The memory management component 224 may provide instructions that when executed by the processors 130 may configure the processors to extend the user device 120 memory resources beyond the available cache memory 140, 150, 160 and/or system memory 170, such as on to the storage resources 180 and/or network resources 190. The processors 130 may be configured to use application information and/or user characteristics to make the determination of which applications and/or data files should be transferred to an extension of memory resources on to storage resources 180 and/or network resources 190. It will be appreciated that in some cases, the memory management component may cooperate with or be part of the O/S of the user device 120 such as in the O/S component 220.

The memory management component 224 may organize the memory and/or storage resources 140, 150, 160, 170, 180, 190 of the user device to provide a cache memory and a storage memory associated with the user device. All data accessed and or used by the processors 130 may be stored in the storage memory and some of the data may be cached in the cache memory. The storage memory may be the highest level or node of the memory hierarchy. In some cases, the highest level of the memory hierarchy may be the storage resources 180. In other cases, the highest level of the memory hierarchy may be the network 190 based resources. The cache memory may include the levels of memory and/or storage that are not the highest level of memory and/or storage. Therefore, the cache memory may include the various levels of cache memory 140, 150, 160 as well as the system memory 170. In the cases where the storage memory includes the network 190 based storage resources, the cache memory may include the storage resources 180. The memory management component 224 may further enable memory management services related to providing a translation to index in the cache memory and the storage memory address. The processes of the memory management component 224 may cooperate with the processes of the TLB component 228 to provide the address space functionality.

The memory management component 224 may further have instructions stored thereon that when executed by the processors 130 may enable the processors 130 to manage various aspects of enabling cache consistency and/or coherency, especially in user devices with multiple processors 130 (or multiple cores) and/or multiple applications accessing the same blocks of data in memory. In one aspect, the processors 130 may be configured to provide coherency between data stored on various levels within the cache memory. Coherency within the various levels of memory and/or storage may be implemented in software, hardware, or the combination of the two. If coherence is implemented in software, some of the cache levels consistency may be managed through software executed on the processors 130. Hardware based consistency circuitry may be in one more cache hierarchy levels. Furthermore, the processors 130 may be configured to provide various operations, such as data lockout to prevent a variety of applications from corrupting data used by a particular application.

The instructions and/or functionality associated with the cache miss handler component 226 may cooperate with the memory control hub 134 or the memory controller 216 and/or the processors 130 to provide various post-cache miss of the cache memory operations. In certain embodiments, the instructions stored in the cache miss handler component 226 may be executed by the processors 130 and/or memory control hub 134 to configure the processors 130 and/or memory control hubs 134 to access one or more page tables, such as one stored in the TLB component 228 to determine a storage address in the storage memory from where to retrieve requested data. In certain embodiments, the cache miss handler component 226 may be part of the O/S 220, the memory control hub 134, and/or the processors 130.

The instructions and/or functionality associated with the TLB component 228 may cooperate with the memory control hub 134, the processors 130 and/or the processes of the memory management component 224 to provide various TLB and page table update and/or access related operations. The processors 130 and/or memory control hub 134 or memory controller 216 may be configured to update a TLB 228 and/or page table. In some cases, the page table may be stored in a TLB 228 and provide information associated with mapping a virtual and/or software data address to a storage address, such as a storage address on the storage memory, such as on the storage resources. In some cases, the processors 130 may be configured to update the TLB 228 upon storing data to the storage memory and/or storage device 180. The storage address in the storage device 180 may be recorded by the processors and/or the memory control hub 134 on the TLB 228 and/or page table.

In certain embodiments, if there is a cache miss, or otherwise if the data is not found in the cache memory, then the processors 130 and/or the memory control hub 134 may access the memory manager of the memory management component 224 and/or the page table stored in the TLB to determine the storage address where the requested data page(s) are located. In this case, the TLB access may indicate that the requested data is stored in the storage memory including storage resources 180 of the user device 120, such as in flash memory. Upon determining the storage address of the requested data, the processors 130 and/or memory control hubs 134 may receive and/or fetch the requested data page(s) from the storage address, such as an address in flash memory storage 180 as part of the storage memory.

The TLB 228 and the page table(s) stored thereon may, in certain cases, be stored in registers 200 of the processor 130 or L1 cache memory 140. In other cases, the TLB 228 may be in lower level cache (e.g. L2 or L3) 150, 160 or system memory 170. In yet other cases, the TLB 228 may be distributed across multiple levels of memory and/or storage such as one or more of cache memory 140, 150, 160, system memory 170, and/or storage 180.

In other embodiments, there may be multi-tiered TLBs 228. Therefore, in these embodiments, if the processors 130 and/or memory control hubs 134 attempt to access particular data, such as data requested by a particular application, the processors 130 and/or memory control hubs 134 may be configured to first seek the data in a partition of the cache memory. If the requested data is found in the first partition of the vitual cache memory, then the data page(s) associated with the requested data may be received and/or retrieve by the processors 130 and/or memory control hubs 134. However, if a cache miss is encountered, then the processors 130 and/or memory control hub 134 may be configured to consult a first TLB 228 to identify a storage address in a second partition of the cache memory. At that point, the processors 130 and/or memory control hub 134 may be configured attempt to receive and/or retrieve the data based, at least in part, on the storage address identified by accessing the first TLB. If the requested data is found, then the data page(s) associated with the requested data may be received and/or retrieve by the processors 130 and/or memory control hubs 134 from the second partition of the cache memory. However, if another cache miss is encountered, then a second TLB 228 may be accessed to determine the storage address in the storage memory where the requested data may be found. At this point the processors 130 and/or memory control hub 134 may be configured to retrieve the requested data and the associated data page(s) from the storage memory.

It will be appreciated that there may be overlap in the functionality of the instructions stored in the operating system (0/S) component 220, the application(s) component 222, the memory management component 224, the cache miss handler component 226, and the translation lookaside buffer (TLB) component 228. In fact, the functions of the aforementioned components 220, 222, 224, 226, 228 may interact and cooperate seamlessly under the framework of the user device 120. Indeed, each of the functions described for any of the components 220, 222, 224, 226, 228 may be stored in any components 220, 222, 224, 226, 228 in accordance with certain embodiments of the disclosure. Further, in certain embodiments, there may be one single component that includes the instructions, programs, and/or applications described within the memory management component 224, the cache miss handler component 226, the translation lookaside buffer (TLB) component 228.

Figure 3:
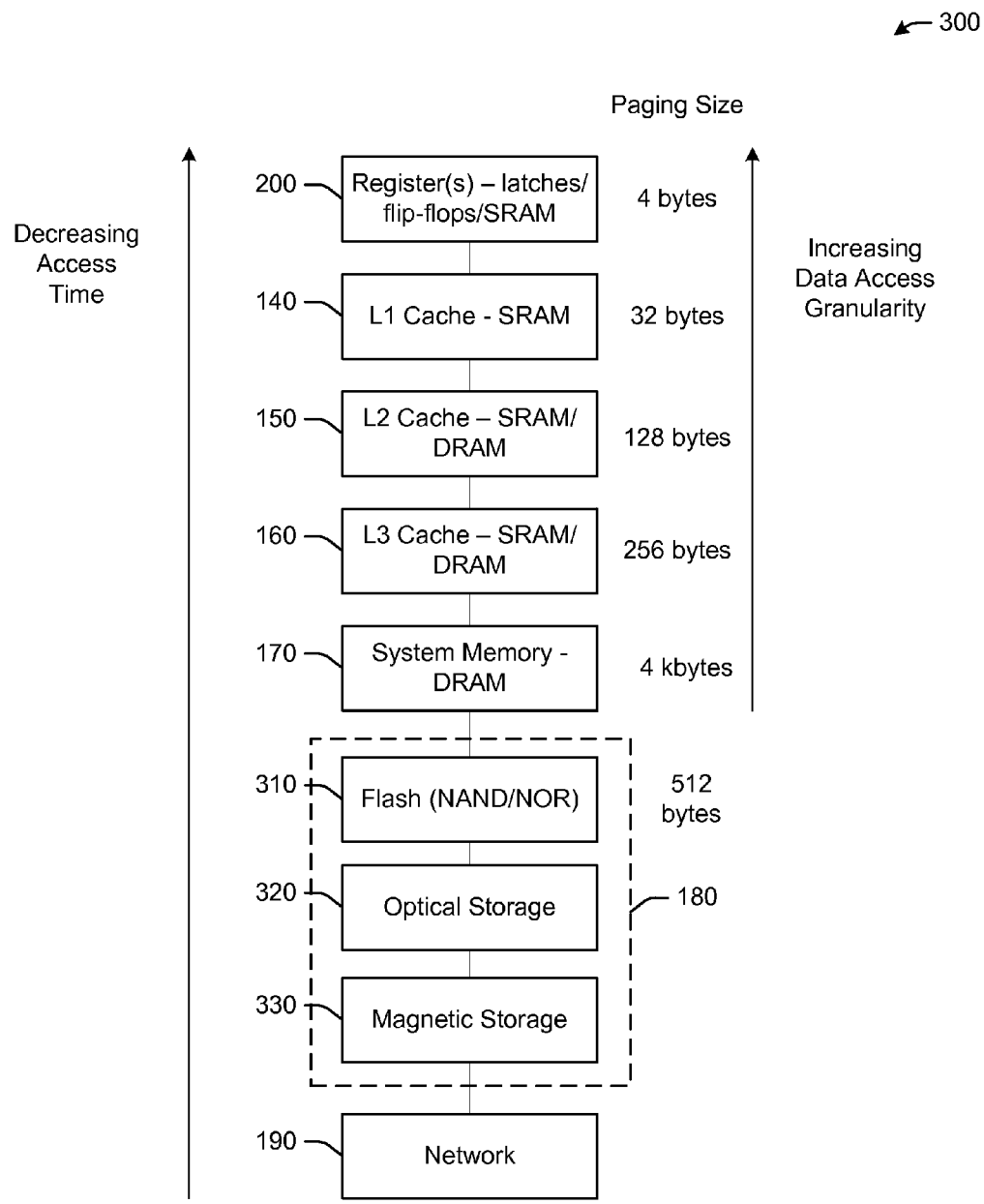
FIG. 3 is a schematic diagram illustrating a memory hierarchy of the example user device of FIG. 1, in accordance with embodiments of the disclosure.

Referring now to FIG. 3, a schematic diagram illustrating an example memory resource hierarchy 300 of the user device 120, in accordance with embodiments of the disclosure, is discussed. Often times processors 130 of user devices may operate at speeds (e.g. clock rates) such that for many applications, bottlenecks in performance may arise from locality, proximity, and/or access latencies of data. Accordingly, memory 140, 150, 160, 170 and storage resources may be organized in the hierarchy 300 of access latencies, size, and data access granularity to provide various levels of storage performance for a variety of data that may be stored and/or accessed by the processors 130, such as for the purpose of executing applications.

As depicted, the registers 200, such as on-chip registers or the processor 130 may provide the least access time for data stored thereon. In one non-limiting example, data may be accessed from the registers 200 by the processors in one or a few clock cycles. The registers 200 may be in the form of latches and/or flip flops on the processors 130, in relative proximity to the processing elements of the processors 130.

Alternatively, the registers 200 may be in the form of SRAM cells. The registers 200 may also have the smallest storage capacity of all of the memory/storage elements. In one non-limiting example, the registers 200 may be few hundred bytes in capacity and may be reserved for data or instructions that are most frequently used by the processors. The registers 200 may also provide the greatest granularity of data that may be accessed and/or stored by the processors 130. In one non-limiting example, the page size of the registers 200 may be approximately 4 bytes.

The various levels of cache memory 140, 150, 160 may be next in the hierarchy 300. The L1 cache 140 may provide the least data access latency and the L3 cache 160 may exhibit the greatest level of data access latency. In some cases, the L1 cache 140 may be integrated on-chip with the processors 130. In other cases, the L1 cache 140 may not be integrated on-chip. In yet other cases, more than one level of cache may be integrated on-chip with the processors 130. In a non-limiting example, the access times for the various levels of cache 140, 150, 160 may range from about a few processor 130 equivalent clock cycle times for L1 cache 140 to about tens or even a hundred processor 130 equivalent clock cycles. The line size of cache memory 140, 150, 160 may range from about 64 bytes to about 256 bytes in size at various levels of cache memory 140, 150, 160 within the hierarchy 300. In some non-limiting cases, all of the levels of cache memory 140, 150, 160 may be implemented as SRAM. In other cases, one or more levels of the cache memory may be implemented as a memory type other than SRAM, such as DRAM.

The system memory 170 may be the next level in the memory hierarchy 300. The system memory 170 may generally have less granularity of data access and a greater access time than the cache memory 140, 150, 160. The access times for data in system memory, in some cases, may be a hundred processor 130 equivalent clock cycles or more. However the size of the system memory 170 may, in certain embodiments be relatively large. In one non-limiting example, the size of the system memory 170 may be in the range of hundreds of megabytes to several gigabytes.

The storage resources 180, as shown here, may include a variety of storage devices, such as flash memory 310, optical storage devices 320, and/or magnetic storage devices 330. These storage devices 180 may include, for example, NAND flash, NOR flash, USB memory devices, optical disc drives, digital video disc (DVD) drives, compact disc (CD) drives, MRAM, hard disc drives, tape drives, or the like. The various types of storage resources may have various data access granularity, access times, and/or capacity; however, in general the storage resources 180 may have greater access time, larger page sizes, and greater capacity than the various levels of cache memory 140, 150, 160. The network 190 based storage resources, such as cloud based storage servers, may have even greater access times and greater storage capacities than the storage resources 180 of the user device 120.

It will be appreciated that the various levels of memory, storage, and network resources, may have various capacities, access granularity, and size and/or capacity. The embodiments, as disclosed herein, may consider these factors of the hierarchy 300 in the determination of where and how to extend the memory resources of the user device 120 on to the storage resources 180 and/or the network resources 190. These factors may also be considered in determining which data, application, and/or files to transfer from cache and/or system memory to memory extended on to storage and/or network resource. In certain embodiments, the aforementioned considerations may be based on optimizing and/or maximizing the user 110 experience with the user device 120.

Therefore, in certain embodiments, in light of the characteristics of the hierarchy 300 data associated with applications that are infrequently used by the user 110 or are not prone to diminish in user experience due to longer data latency may be relatively more likely to be transferred to memory extended on to storage and/or network resources, in a limited memory environment.

The cache memory 140, 150, 160, system memory 170, storage 180, any databases, and/or any other memory modules, both removable and non-removable, are all examples of computer-readable storage media. For example, computer-readable storage media may include volatile and non-volatile, removable and non-removable media implemented in any method or technology for storage of information such as computer-readable instructions, data structures, program modules, and/or other data.

Illustrative Processes

Figure 4:
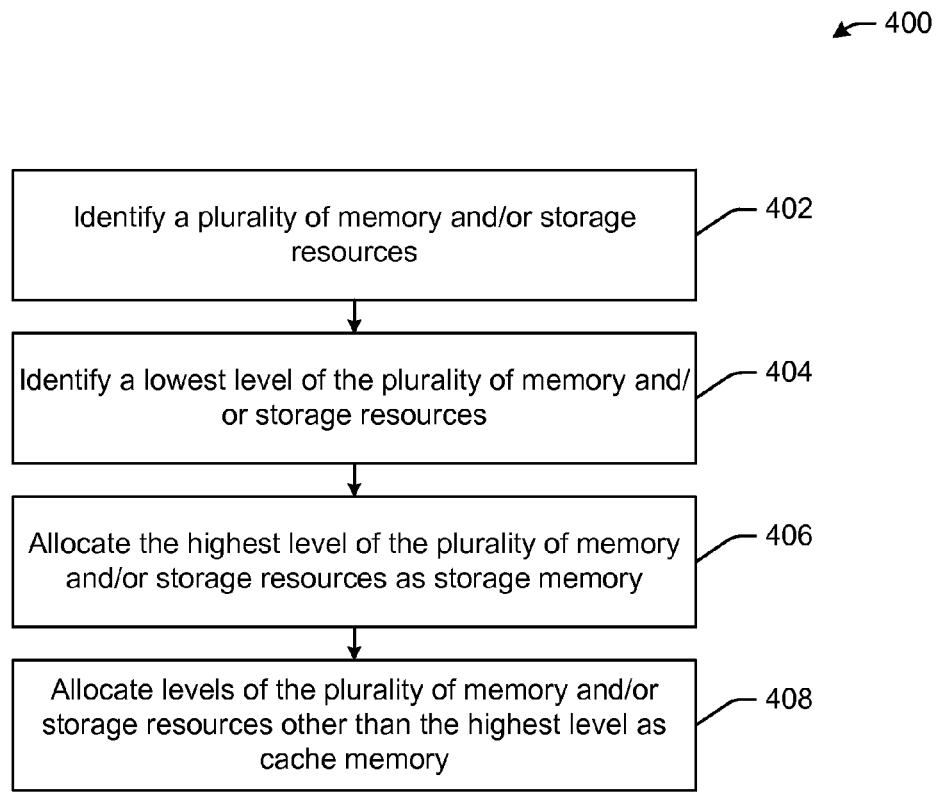
FIG. 4 is a flow diagram illustrating an example method for allocating levels of memory and/or storage resources to cache memory and/or storage memory, in accordance with embodiments of the disclosure.

Referring now to FIG. 4, an example method 400 for allocating levels of memory and/or storage resources to cache memory and/or storage memory, in accordance with embodiments of the disclosure, is discussed. The configuration of the memory and/or storage resources may be preconfigured on the user device 120 in certain embodiments, such as by a provider (e.g. manufacturer or retailer) of the user device 120. In the same or other embodiments, the configuration of the user device 120 may be performed by the processors 130 thereon.

At block 402, a plurality of memory and/or storage resources may be identified. These memory and/or storage resources may include the variety of levels of cache memory 140, 150, 160, the system memory 170, the storage resources 180, such as NAND flash 310, and/or network 190 based storage resources. These memory and/or storage resources may be identified by the processors 130 by a system configuration and/or a configuration file associated with the O/S 220 and indicative of system level resources.

At block 404, the highest level of memory and/or storage resources may be identified. In some cases, the highest level of memory may be the storage resources 180, such as in the form of one or more of flash memory 310, optical storage devices 320, and/or magnetic storage 330. In other cases, the highest level of memory and/or storage resources may be network 190 based storage resources.

At block 406, the highest level of the plurality of memory and/or storage resources may be allocated as storage memory. Therefore, in some cases the storage memory may include the storage resources 180. In other cases, the storage memory resources may include the network 190 based storage resources. At block 408, the levels of the memory and/or storage resources other than the highest level may be allocated as cache memory. Therefore, in some cases the cache memory may include the various levels of cache memory 140, 150, 160 and the system memory 170. In other cases, the cache memory resources may include the various levels of cache memory 140, 150, 160, the system memory 170, and the storage resources 180. It should be noted that in some cases, a portion of the system memory 180 may be separately allocated for non-cacheable data read and write.

Although the cache memory as discussed in the context of method 400 may include three levels of cache 140, 150, 160 and system memory 170, it will be appreciated that various embodiments of the disclosure may have any suitable memory hierarchy. For example, in some non-limiting cases, there may only be one level of cache 140. In other non-limiting cases, there may be two levels of cache memory 140, 150. Furthermore, in some cases, there may be partitions within blocks of memories or within a particular level of memory. For example, a particular level of cache memory 140, 150, 160 may be partitioned to a data cache and an instruction cache. Therefore, it will be appreciated that in certain embodiments, data and/or instructions stored in memory may be segregated by type of data and/or instructions.

Figure 5:
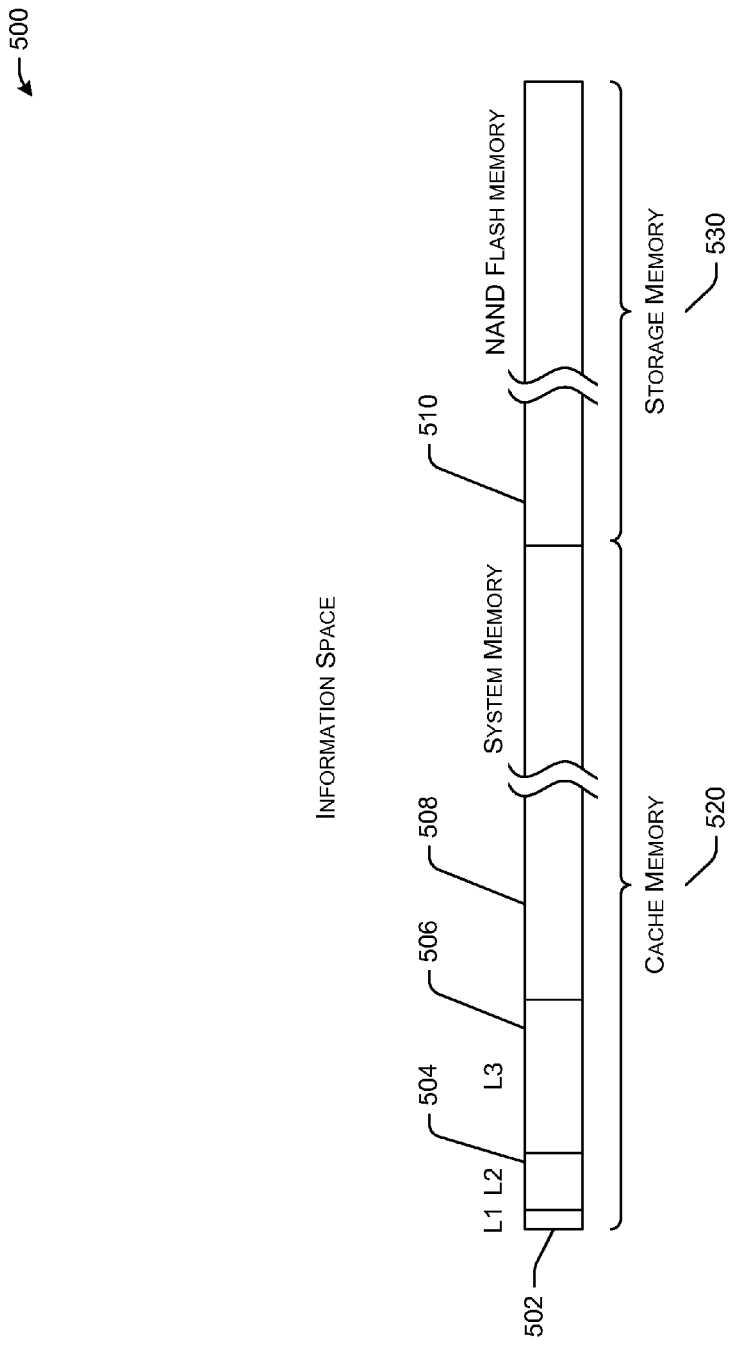
FIG. 5 is a schematic diagram that illustrates an example information space with allocation of memory and/or storage resources to cache memory and/or storage memory, in accordance with embodiments of the disclosure.

Referring now to FIG. 5, a schematic diagram that illustrates an example information space 500 with allocation of memory and/or storage resources to cache memory 520 and/or storage memory 530, in accordance with the method 400, is discussed. In this case, the highest level of the memory and/or storage hierarchy may be memory capacity 510 of NAND flash memory 310. Therefore, the NAND flash memory 310 may be allocated as the storage memory 530. The memory capacities 502, 504, 506, and 508 of L1 cache 140, L2 cache 150, L3 cache 160, and system memory 170, respectively, may be virtualized as the unified cache memory 520. It should be noted that the cache memory 520 and the storage memory 530 may at least partially overlap.

It will be appreciated that by extending the addressable information space 500 of the user device 120 beyond just the cache memories 140, 150, 160 and the system memory 170 to the NAND flash memory 310, the size of the information space 500 of the user device 120 may be expanded, sometimes significantly. Furthermore, due to the relatively large size of the cache memory 520, relatively large segments of the data stored in the overall information space 500 may be cached in the cache memory 520 for relatively fast access by the processors 120, and therefore the relatively slow access speeds of the NAND flash memory device 310 may be mitigated, at least in part, during the execution of applications by the processors 130.

Figure 6:
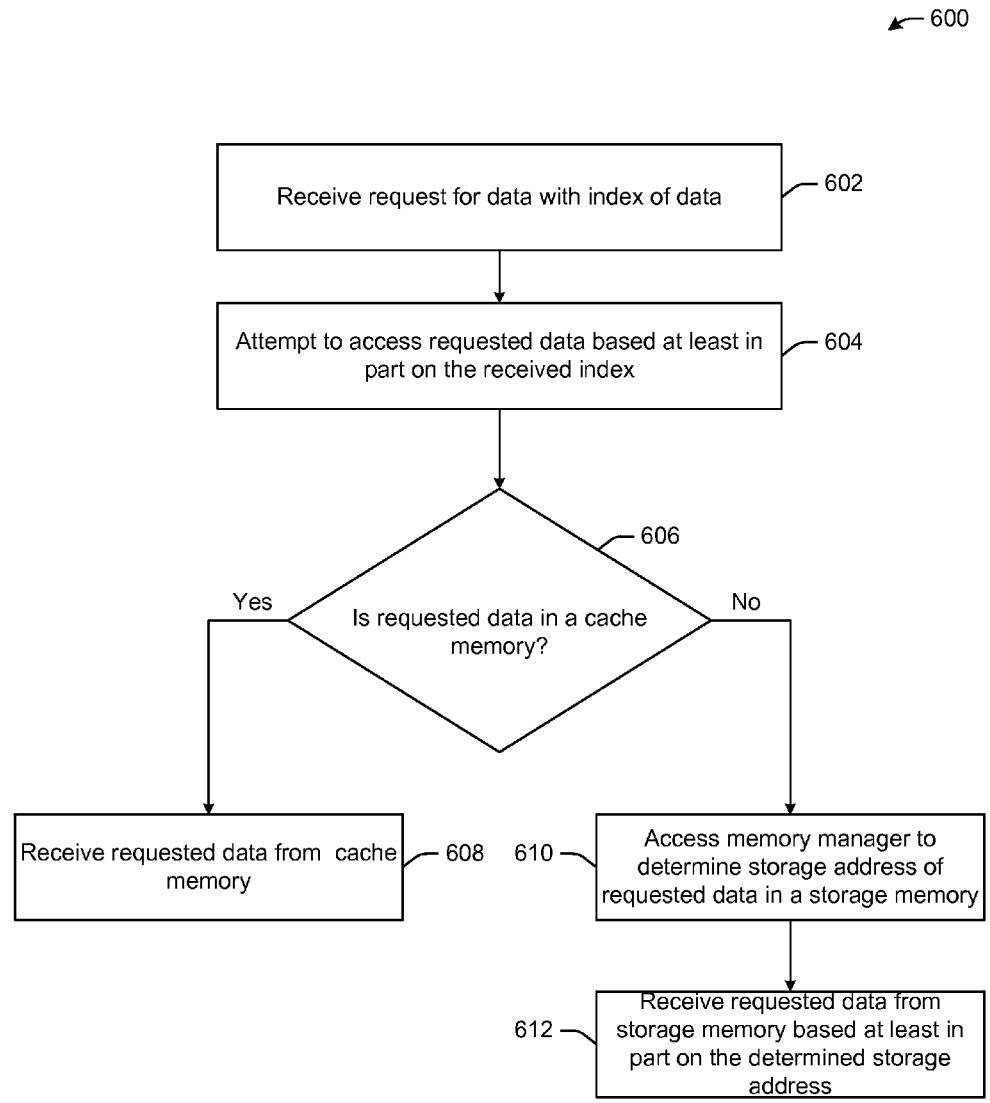
FIG. 6 is a flow diagram illustrating an example method for accessing data elements from memory and/or storage, in accordance with embodiments of the disclosure.

Referring now to FIG. 6, an example method 600 for accessing data elements from memory and/or storage, in accordance with embodiments of the disclosure, is discussed. The method 600 may be performed by the processors 130 in cooperation with one or more other elements of user device 120, such as the memory control hub 134.

At block 602, a request for data may be received with an index of the data. The request may be received by the processors 130 in the form of one or more data packets. In certain embodiments, the request for data may be generated by the processors 130 based at least in part on execution of one or more applications 222 thereon. The index of the data, as received with the request for data, may be a logical address, software address, or virtual address, such as one provided by an application being executed by the processors 130. This index may indicate a location in the cache memory where the data may be found, if the data is indeed cached in the cache memory. If the data is not cached in the cache memory, then the index, through accessing a memory manager, may provide a physical location where the requested data may be found in the storage memory. It will be appreciated that the requested data may be cacheable data.

At block 604, the data may be requested based at least in part on the received index. In certain embodiments, where the various levels of cache memory 140, 150, 160 and the system memory 170 are grouped as cache memory, the processors 130 may attempt to retrieve the data based at least in part on the received index with the request for data. From the perspective of the O/S 220 or the processors 130, the system memory 170 may be viewed as cache memory 140, 150, 160, in certain embodiments, as the combined cache memory. As a result, the index may be used by the processors 130, directly or via the memory control hub 134, to access the memory resources provided by a combination of cache memory 140, 150, 160 with system memory 170. Therefore, in this case, the processors 130 and/or the memory control hub 134 may not access a memory manager 228 to access data that may be stored on system memory 170.

At block 606, it may be determined if the data requested is in the cache memory. If at block 606 it is found that the requested data is in the cache memory, then the method 600 may proceed to block 608, where the data may be received from the cache memory by the processors 130. The requested data may be received via one or more data busses by the processors 130 from the cache memory 140, 150, 160 or the system memory 170 that comprises the cache memory. In certain embodiments, the processors 130 and/or the memory control hubs may retrieve the data from where it is stored by adjudicating the use of data busses by which the requested data is to be transmitted.

If at block 606, it is determined that the data is not in the cache memory, then the method 600 may proceed to block 610 where the memory manager 224 and/or TLB 228 may be accessed to determine the storage address in the storage memory of the data. The storage address may, in certain embodiments, point to the next level (e.g. the highest level) in the hierarchy 300 of memory. For example, the storage address may point to an extension of the memory resources of the user device 120 beyond the system memory 170 and on to the storage resources 180 and/or network resources 190 as the storage memory.

At block 612, the data may be received from the storage memory, based at least in part on the determined storage address in the storage memory. The requested data may be received via one or more data busses by the processors 130 from the storage resources 180 and/or network 190 based resources of the user device 120. It will be appreciated that the storage resources may have less granularity in the access and transfer of data (i.e. page size). Therefore, in certain embodiments, data may be received by the processors 130, along with the requested data, that may not be needed for any purpose by the processors. This data that is not required may be received and ignored by the processors 130. This is sometimes referred to pre-fetching data.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 7:
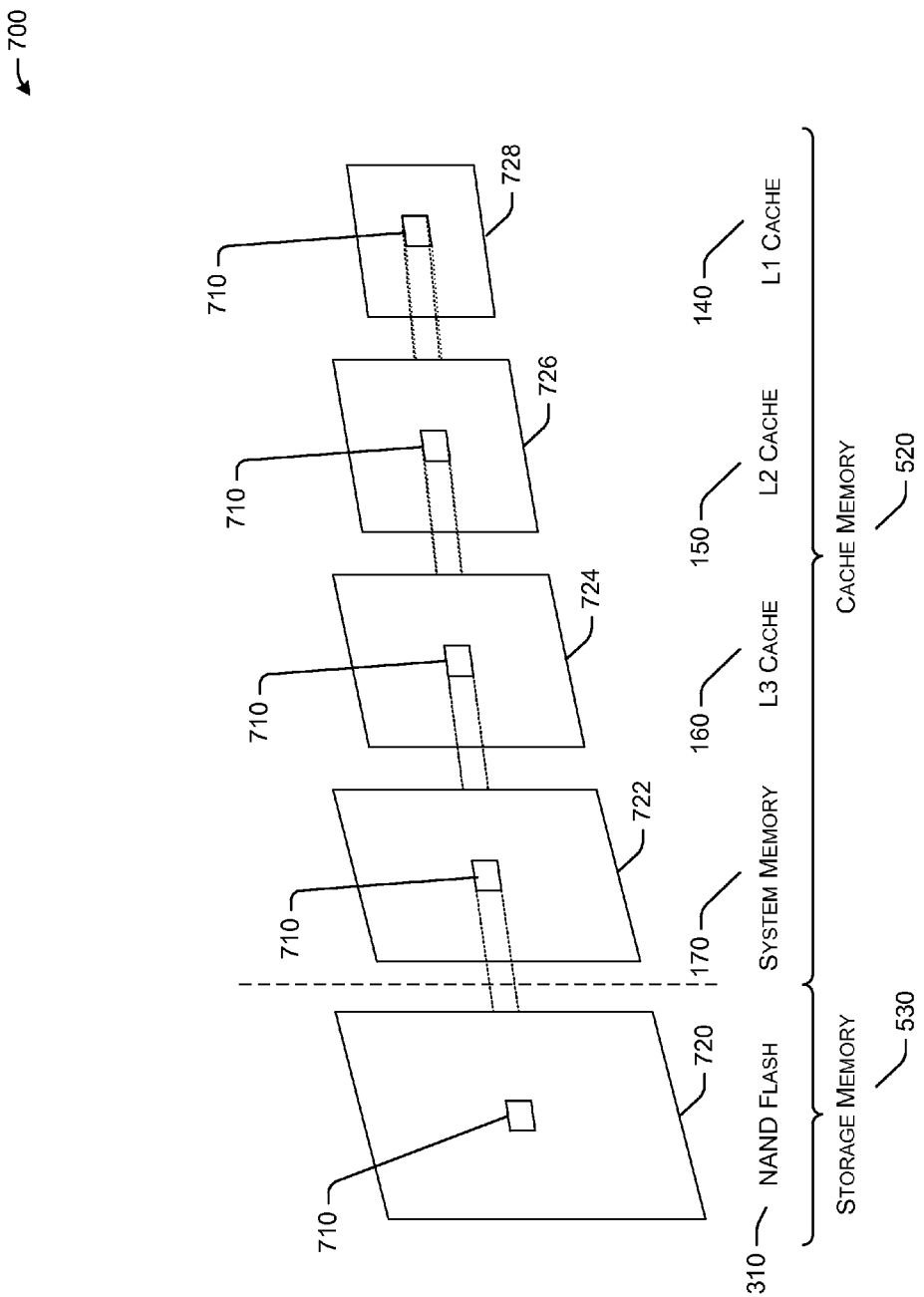
FIG. 7 is a schematic diagram illustrating example process for receiving a data element from the storage memory via various levels of memory and/or storage hierarchy, in accordance with embodiments of the disclosure.

Referring now to FIG. 7 an example process 700 for receiving a data element 710 from the storage memory 530 via various levels of memory and/or storage hierarchy 310, 170, 160, 150, 140, 200, in accordance with embodiments of the disclosure is discussed. Since the granularity (e.g. minimum page size) of accessing data at the cache memory may be larger than at higher levels of memory, a relatively large page 720, including the requested data element 710 may be cached onto the system memory 170 of the cache memory 520. Subsequently, the requested data 710 may be transferred to higher levels of the memory hierarchy in finer and finer granularities, as depicted by data page sizes 724, 726, and 728. Ultimately the requested data may be loaded onto one or more registers 200 of the processors 130 for use, such as by an application that requested the particular data 710.

Figure 8:
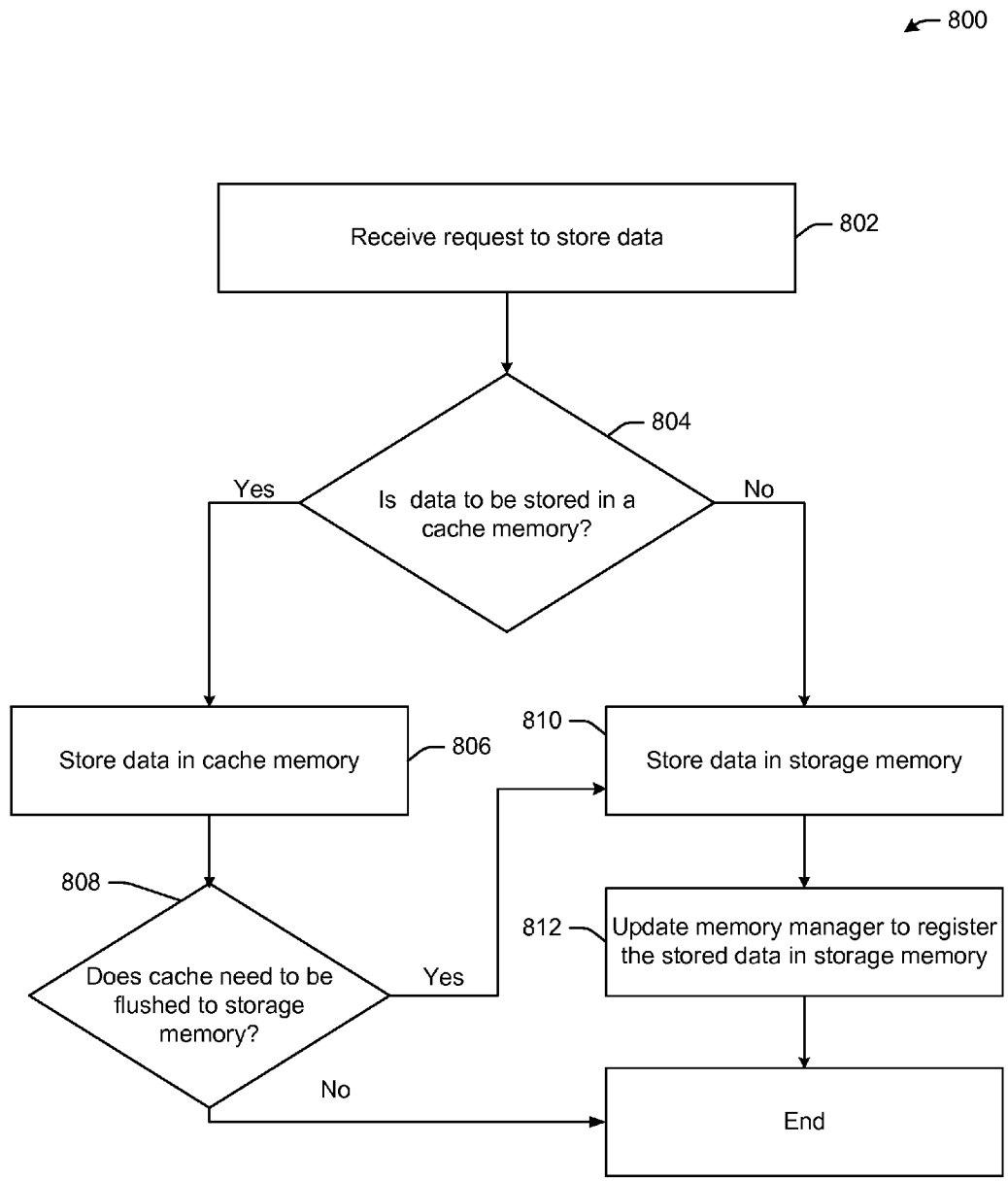
FIG. 8 is a flow diagram illustrating an example method for writing data elements to memory and/or storage, in accordance with embodiments of the disclosure.

Referring now to FIG. 8 an example method 800 for writing data elements to memory and/or storage, in accordance with embodiments of the disclosure is discussed. Although the cache memory as discussed in the context of method 800 may include three levels of cache 140, 150, 160 and system memory 170, it will be appreciated that various embodiments of the disclosure may have any suitable memory hierarchy.

For example, in some non-limiting cases, there may only be one level of cache 140. In other non-limiting cases, there may be two levels of cache memory 140, 150. Furthermore, in some cases, there may be partitions within blocks of memories or within a particular level of memory. For example, a particular level of cache memory 140, 150, 160 may be partitioned to a data cache and an instruction cache. Therefore, it will be appreciated that in certain embodiments, data and/or instructions stored in memory may be segregated by type of data and/or instructions. The method 800 may be performed by the processors 130 in cooperation with one or more other components of user device 120, such as, in certain embodiments, the memory control hub 134.

At block 802, a request to store a data element may be received. This request, in some cases, may be generated by the processors 130, such as by one or more applications being executed by the processors 130. For example, a particular application that is operating on the user device 120 and the processors 130 thereon may instruct the processors 130 to store a particular temporary file and/or other data associated therewith in the information space 500 to enable the functioning of the application on the processors 130. In other cases, the instruction to store the first data element may be received form one or more of the other elements of the user device 120, such as the I/O devices 124, 126. In yet other cases, the user 110 may attempt to open an application and/or data file and, in so doing, may generate a request for storing a data element and/or receive an allocation of memory for the use and/or execution of the application and/or data file. The requested allocation of memory resources may correspond to the expected use of an application that the user 110 may choose to execute on the user device 120.

At block 804, it may be determined if the data is to be stored in the cache memory 520. This determination may be made based at least in part on the received request at block 802. In some cases, the application with which the data store request is associated may specify if the data is to be stored in the cache memory 520 or only in the storage memory 530.

If at block 804, it is determined that the data is to be stored in the cache memory, then at block 806 the data may be stored on to the cache memory subject to memory consistency models. At block 808, it may be determined if the cache needs to be flushed to storage memory. If so, then the method may proceed to block 810. Otherwise, the method 800 may end. If, at block 804 it was determined that the data is not to be stored on the cache memory 520, then at block 810, the data may be stored on the storage memory 530. Upon storing the data in the storage memory 530, at block 812, the memory manager and/or TLB may be updated based at least in part on the stored data in the storage memory. An index associated with the data, such as an index received from the application requesting the store of the data, may be associated with a storage address of the store of the data on the storage memory 530.

It should be noted that the method 800 may be modified in various ways in accordance with certain embodiments. For example, one or more operations of the method 800 may be eliminated or executed out of order in other embodiments. Additionally, other operations may be added to the method 800 in accordance with other embodiments.

Figure 9:
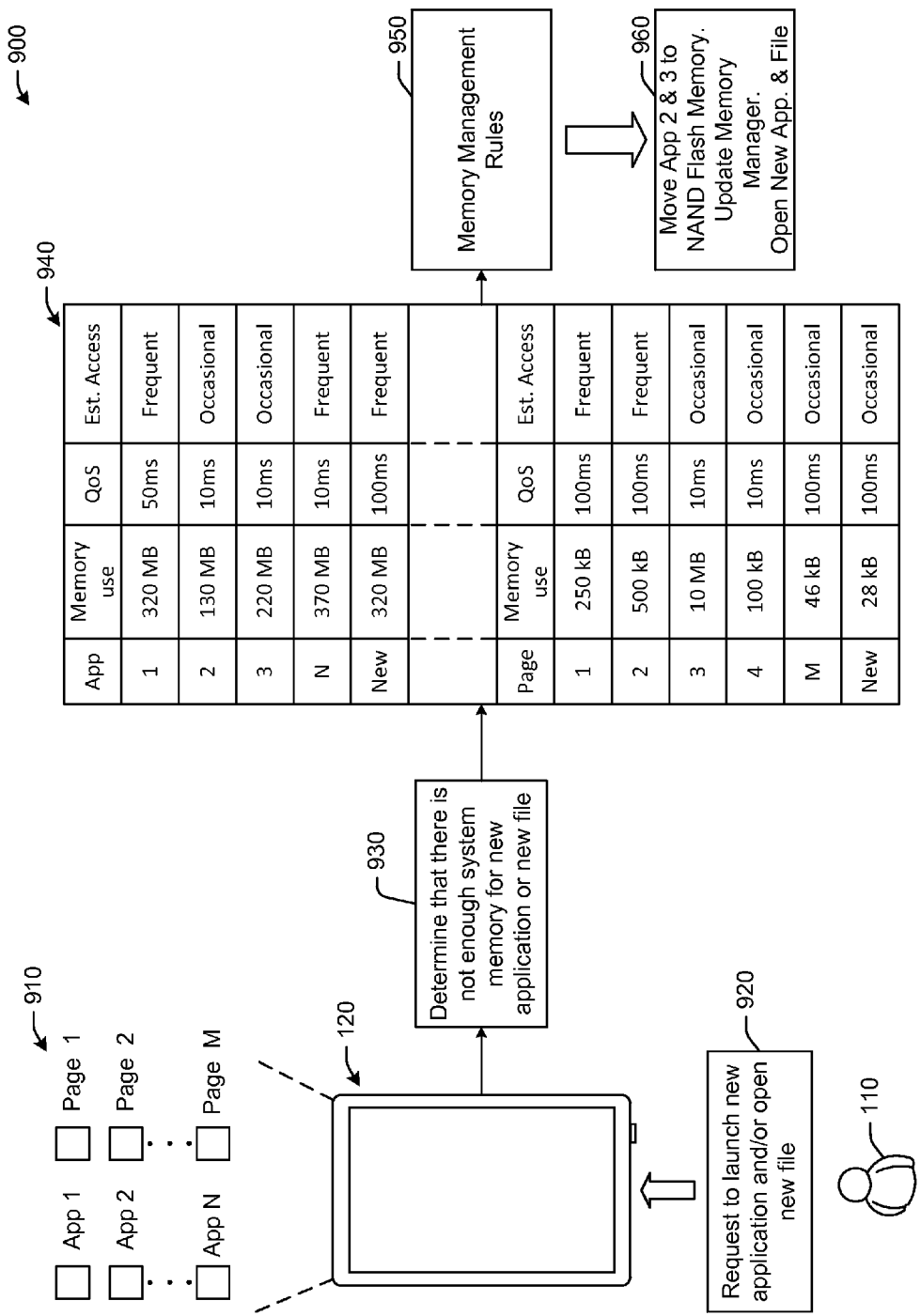
FIG. 9 is a schematic diagram illustrating an example scenario in which data elements are moved from cache memory to storage memory, in accordance with embodiments of the disclosure.

Referring now to FIG. 9 an example scenario 900 in which data elements are moved from system memory 170 to storage 180, in accordance with embodiments of the disclosure, is described. As depicted, the user device 120 may currently be executing and/or accessing a variety of applications (App 1, App 2, . . . , App N) and/or data pages (Page 1, Page 2, . . . , Page M) 910. These applications and pages 910 may be utilizing memory resources at the cache memory 520 of the user device 120. In certain embodiments, the processors 130 may ascertain the level of memory resource usage, such as a percentage of available memory, for running and/or accessing the applications and/or data files 910.

The user 110 may interact with the user device 120, such as via I/O components 124, 126, to request 920 launching a new application and/or open a new data file. At this point the user device 120 and the processors 130 thereon may identify the expected memory resource usage associated with the requested 920 new application and/or data file by the user 110. In this scenario 900, the processors 130 may determine 930 that the available memory resources of the user device 120 may be insufficient to open the requested 920 new application and/or data file with associated memory allocation and/or usage in cache memory 520.

Upon determining 930 the insufficiency of available cache memory resources of the user device 120 to run and/or access the currently running and/or accessed data files and open the newly requested 920 application and/or data files, the processors 130 may consider various aspects of application information and/or user characteristics 940 associated with each of the current and/or requested applications and/or files. The metrics and parameter values of the application information and user characteristics 940 associated with the current and requested applications and data files are depicted in a tabular format. It will be appreciated that while application information and user characteristics 940 in the form of "memory use," "quality of service (QoS)," and "estimated access" are shown, there may be any number and variety of application information and user characteristics 940 that may be considered.

The metrics and parameter values of the application information and user characteristics 940 associated with the current and requested applications and data files may next be applied to one or more memory management rules 950, such as memory management rules stored in the memory management component 224. These memory management rules 950 may be applied, such as in an algorithmic manner, to the application information and user characteristics 940 by the processors 130 to make a determination of which application's and/or data page's memory allocation and/or other data elements are to be swapped out to the storage memory 530 of the user device 120 on to the storage resources 180.

In this case, the processors 130 may determine that applications 2 and 3 may use approximately the same amount of memory as the requested application 920, while applications 2 and 3 may be accessed less frequently than other applications. The processors 130 may also determine that the size of the newly requested data file may be large enough to enable the launch of the new application 920 by allocating required space on the cache memory 520. Accordingly, the processors 130 may determine that applications 2 and 3 should be moved to of the storage memory resources, such as onto NAND flash memory 960. This may free up 350 MB of cache memory 520 capacity to launch the newly requested application and data file 920. Additionally, as memory allocation is moved from one level of memory to another (e.g. the cache memory resources onto NAND flash of the storage memory), the memory manager and/or TLB may be updated with information mapping the storage address of the moved data pages associated with applications 2 and 3 with logical, software, and/or virtual addresses associated with those transferred data pages. Upon freeing up sufficient cache memory 520 capacity the user device 120 may launch and/or open the new application and data file 920, as requested by the user 110. It can be seen that in this example, the user device 120, instead of having to shut down one or more applications to accommodate a newly requested application by the user, the user device 120 extended its memory resources onto storage resources and by doing so, may enhance user 110 experiences with the user device 120.

It will be appreciate that in certain example embodiments, a flash drive or hard drive on a tablet computing device may be storage memory (e.g. when the tablet computing device does not use a network storage resource) and in other example embodiments the tablet flash drive or hard drive may be cache memory (e.g. when the tablet computing device does use a network storage resource).

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The invention claimed is:

1. A computing system, comprising:
a volatile memory comprising at least one level of cache memory and system memory;
a non-volatile memory comprising at least one storage device;
at least one processor that is configured to access computer-executable instructions on at least one of the volatile memory or the non-volatile memory, wherein the at least one processor executes the computer-executable instructions to:
receive a request for a data element, wherein the request for the data element includes at least one index associated with the data element;
determine, based at least in part on the at least one index, that the requested data element is not stored in the volatile memory;
access a memory manager to determine, based at least in part on the at least one index, at least one storage address associated with the requested data element;
determine, based at least in part on the at least one storage address, that the requested data element is not stored in the non-volatile memory;
determine a network address for the data element on a network storage resource; and
retrieve, based at least in part on the network address, the requested data element from the network storage resource.

2. The system of claim 1, wherein:
the at least one level of cache memory comprises at least one of: (i) a Level 1 cache memory; (ii) a Level 2 cache memory; (iii) a Level 3 cache memory; (iv) an on-chip cache memory; or (v) an off-chip cache memory;
the system memory comprises at least one of: (i) random access memory (RAM); (ii) static RAM (SRAM); (iii) synchronous dynamic RAM (SDRAM); (iv) double data rate (DDR) SDRAM (DDR-SDRAM); or (v) RAM-BUS DRAM (RDRAM); and
the storage device comprises at least one of: (i) solid state drive (SSD); (ii) flash memory; (iii) NAND flash memory; (iv) NOR flash memory; (v) hard disc drive (HDD) storage; (vi) magnetoresistive RAM (MRAM); (vii) USB flash drive; or (viii) an optical disc.

3. The system of claim 1, wherein the at least one processor is further configured to execute the computer-executable instructions to retrieve the requested data element by transferring of the requested data from the network storage resources to the volatile memory and further to a register of the at least one processor.

4. The system of claim 1, wherein the at least one processor is further configured to execute the computer-executable instructions to retrieve the requested data element by accessing a translation lookaside buffer (TLB).

5. The system of claim 1, wherein the at least one processor is further configured to execute the computer-executable instructions to:
receive a request to store a second data element;
determine that the second data element is to be stored in the non-volatile memory;
store the second data element in the non-volatile memory;
store the second data element on the at least one network storage resource; and
update the memory manager using information indicating a location of the second data element in the non-volatile memory.

6. The system of claim 1, wherein the at least one processor is further configured to execute the computer-executable instructions to:
receive a second request for a second data element, wherein the request for the second data element includes at least one index associated with the second data element;
determine, based at least in part on the at least one index, that the requested second data element is not stored in the volatile memory;
access a memory manager to determine, based at least in part on the at least one index, at least one second storage address associated with the requested second data element; and
retrieve, based at least in part on the at least one second storage address, the requested second data element from the non-volatile memory.

7. A method, comprising:
  receiving, by one or more processors communicatively coupled to a volatile memory, a non-volatile memory, and a network storage resource, a request for retrieving a data element;
  determining, by the one or more processors, that the data element is not stored in the volatile memory;
  determining, by the one or more processors, that the data element is not stored in the non-volatile memory;
  determining, by the one or more processors, a network address for the data element on the network storage resource; and
  retrieving, by the one or more processors, the requested data element from the network storage resource using the network address.

8. The method of claim 7, wherein:
  the volatile memory comprises at least one of: (i) a Level 1 cache memory; (ii) a Level 2 cache memory; (iii) a Level 3 cache memory; (iv) an on-chip cache memory; or (v) an off-chip cache memory (vi) random access memory (RAM); (vii) static RAM (SRAM); (viii) synchronous dynamic RAM (SDRAM); (ix) double data rate (DDR) SDRAM (DDR-SDRAM); or (x) RAM-BUS DRAM (RDRAM); and
  the non-volatile memory comprises at least one of: (i) a solid state drive (SSD); (ii) a flash memory; (iii) a NAND flash memory; (iv) a NOR flash memory; (v) a hard disc drive (HDD) storage; (vi) a magnetoresistive RAM (MRAM); (vii) a USB flash drive; or (viii) an optical disc.

9. The method of claim 7, further comprising:
  storing, by the one or more processors, the requested data element in the non-volatile memory; and
  updating, by the one or more processors, the memory manager using an index associated with the data element.

10. The method of claim 7, further comprising storing, by the one or more processors, the data element in the volatile memory.

11. The method of claim 10, wherein storing the data element in the volatile memory is based on at least one of: (i) memory requirements of the data element; (ii) memory bandwidth requirements; (iii) data access latency requirements; (iv) expected frequency of access of the data element; (v) block size of memory allocation; or (vi) a previous time the data element was accessed.

12. The method of claim 10, further comprising updating, by the one or more processors, a translation lookaside buffer (TLB) associated with the volatile memory.

13. The method of claim 7, further comprising:
  receiving, by one or more processors, a request for storing a second data element;
  storing, by the one or more processors, the second data element in the non-volatile memory;
  identifying, by the one or more processors, a storage address associated with the storage of the second data element in the non-volatile memory; and
  updating, by the one or more processors, the memory manager based at least in part on the storage address.

14. At least one computer-readable medium comprising computer-executable instructions that, when executed by one or more processors, execute a method comprising:
  receiving a request for a data element, wherein the request for the data element includes at least one index associated with the data element;
  determining, based at least in part on the at least one index, that the requested data element is stored in a network storage resource; and
  retrieving, based at least in part on the determining, the requested data element from the network storage resource.

15. The at least one computer-readable medium of claim 14, wherein the method further comprises determining that the requested data element is not stored in a volatile memory or a non-volatile memory and accessing a memory manager to determine a network storage address associated with the at least one index.

16. The at least one computer-readable medium of claim 15, wherein:
  the volatile memory comprises at least one of: (i) a Level 1 cache memory; (ii) a Level 2 cache memory; (iii) a Level 3 cache memory; (iv) an on-chip cache memory; (v) an off-chip cache memory (vi) random access memory (RAM); (vii) static RAM (SRAM); (viii) synchronous dynamic RAM (SDRAM); (ix) double data rate (DDR) SDRAM (DDR-SDRAM); or (x) RAM-BUS DRAM (RDRAM); and
  the non-volatile memory comprises at least one of: (i) a solid state drive (SSD); (ii) a flash memory; (iii) a NAND flash memory; (iv) a NOR flash memory; (v) a hard disc drive (HDD) storage; (vi) a magnetoresistive RAM (MRAM); (vii) a USB flash drive; or (viii) an optical disc.

17. The at least one computer-readable medium of claim 15, wherein retrieving the requested data element further comprises retrieving the data element from the network storage resources based at least in part on the network storage address.

18. The at least one computer-readable medium of claim 14, wherein the method further comprises:
  receiving a request to store a second data element;
  determining that the second data element is to be stored in a non-volatile memory;
  storing the second data element in the non-volatile memory; and
  updating a memory manager using information indicating a location of the data element in the non-volatile memory.

19. The at least one computer-readable medium of claim 18, wherein updating the memory manager further comprises associating an index associated with a storage address corresponding to a location on the non-volatile memory where the second data element is stored.

20. The at least one computer-readable medium of claim 18, wherein the method further comprises storing the second data element in a volatile memory.

* * * * *